United States Patent
Popescu et al.

(10) Patent No.: US 10,162,948 B2
(45) Date of Patent: Dec. 25, 2018

(54) OBJECT-BASED USER AUTHENTICATION

(71) Applicant: HEWLETT-PACKARD DEVELOPMENT COMPANY, L.P., Houston, TX (US)

(72) Inventors: Valentin Popescu, Houston, TX (US); James Robert Waldron, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 15/035,307

(22) PCT Filed: Dec. 6, 2013

(86) PCT No.: PCT/US2013/073568
§ 371 (c)(1),
(2) Date: May 9, 2016

(87) PCT Pub. No.: WO2015/084392
PCT Pub. Date: Jun. 11, 2015

(65) Prior Publication Data
US 2016/0300046 A1   Oct. 13, 2016

(51) Int. Cl.
| | | |
|---|---|---|
| G06F 21/31 | (2013.01) | |
| G06F 21/34 | (2013.01) | |
| G06K 9/62 | (2006.01) | |
| H04N 5/225 | (2006.01) | |

(52) U.S. Cl.
CPC .............. *G06F 21/31* (2013.01); *G06F 21/34* (2013.01); *G06K 9/6202* (2013.01); *H04N 5/225* (2013.01)

(58) Field of Classification Search
None
See application file for complete search history.

(56) References Cited

U.S. PATENT DOCUMENTS

| | | | |
|---|---|---|---|
| 4,218,674 A | 8/1980 | Brosow et al. | |
| 7,725,717 B2 | 5/2010 | Roux et al. | |
| 8,371,501 B1 | 2/2013 | Hopkins | |
| 8,389,069 B2 | 3/2013 | Gregoratti et al. | |
| 8,819,812 B1 * | 8/2014 | Weber | G06F 3/017 |
| | | | 726/18 |
| 2007/0086626 A1 | 4/2007 | Mariani et al. | |
| 2007/0126550 A1 | 6/2007 | Richardson | |
| 2007/0150745 A1 * | 6/2007 | Peirce | G06F 21/32 |
| | | | 713/186 |

(Continued)

FOREIGN PATENT DOCUMENTS

WO    WO2011077459 A2  *  6/2011

OTHER PUBLICATIONS

Al-Muhtadi, J. et al.; "A Flexible, Privacy-preserving Authentication Framework for Ubiquitous Computing Environments"; Jul. 31, 2001; 6 pages.

*Primary Examiner* — Fatoumata Traore
(74) *Attorney, Agent, or Firm* — HPI Patent Department

(57) ABSTRACT

An authentication system in accordance with an example includes an image capture device to scan an object. The authentication system also includes an authentication module to identify imperfections in the object based on the scan, to generate model data based on the identified imperfections, and to authenticate the user based on a comparison of currently identified imperfections to the model data.

9 Claims, 4 Drawing Sheets

(56) References Cited

U.S. PATENT DOCUMENTS

| | | |
|---|---|---|
| 2008/0267514 A1 | 10/2008 | Alasia et al. |
| 2011/0156867 A1 | 6/2011 | Carrizo et al. |
| 2012/0070024 A1* | 3/2012 | Anderson ............ H04R 25/505 |
| | | 381/328 |
| 2012/0300985 A1* | 11/2012 | Ito ........................... G06F 21/32 |
| | | 382/103 |
| 2013/0011007 A1 | 1/2013 | Muriello et al. |
| 2014/0200737 A1* | 7/2014 | Lortz ..................... B60R 25/25 |
| | | 701/1 |

* cited by examiner

OBJECT-BASED USER AUTHENTICATION

BACKGROUND

Recently, a lot of attention and research has been devoted to the prevention of identity theft and fraud due to threats posed to all aspects of commercial and consumer activities. Authentication techniques reduce or prevent identity theft by proving the identity of a user. Some examples of authentication techniques include personal identification numbers (PINs) or passwords, public key infrastructure (PKI), biometric indicators (e.g., fingerprint, iris scan, voice recognition, etc.), and electronic tag (e.g., radio frequency identifier (RFID) tag) comprising a unique tag identifier.

BRIEF DESCRIPTION OF THE DRAWINGS

Some examples of the present application are described with respect to the following figures.

DETAILED DESCRIPTION

Figure 1:
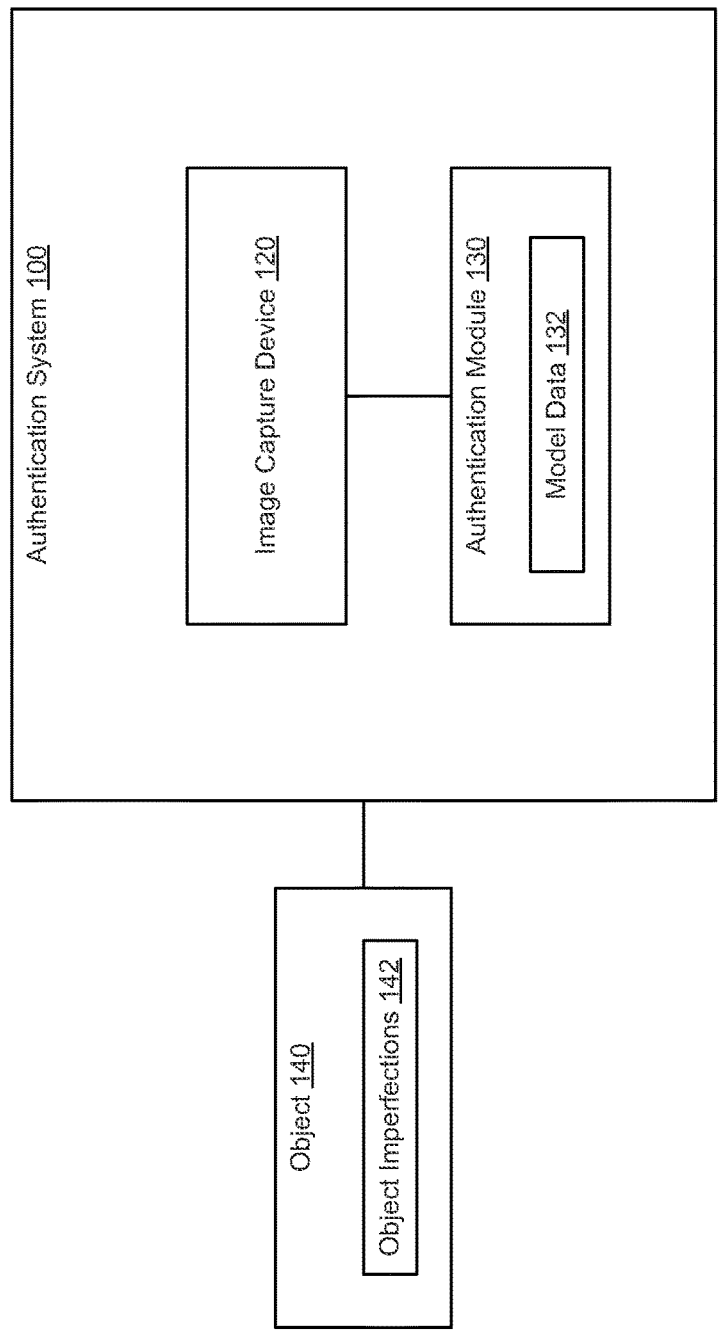
FIG. 1 illustrates an example of an authentication system for authenticating a user based on an object.

Some authentication techniques are more reliable than others. For example, traditional authentication methods through username and password combinations can be cracked by simple guessing or by using brute force algorithms. As another example, badges, tags, tokens, and other electronic tags can easily be stolen or misplaced by the user, or the user may forget to have them on their person when requested during authentication. Moreover, some of these devices are expensive, require battery power, lack aesthetic appeal to the user or are fashionably unappealing, and may be subject to drive-by snooping. In addition to being expensive, in some cases, biometric authentication may be undesirable because it is unchangeable. For example, if someone's unique fingerprint is compromised and copied, it cannot be changed.

Examples described herein provide an authentication solution in which a person can be authenticated using an object. For example, a user may provide their own/personal object (e.g., a fashionably accessible device or a wearable device) to be used as an authentication device. Such objects/devices do not require solid state electronics or batteries, and are virtually maintenance free. The solution relies on the fact that objects (e.g., based on the user's choice), for example, fashion accessories (e.g., ring, bracelet, belt buckle, or other jewelry) acquire unique imperfections through the manufacturing processes and/or daily use. These imperfections can be read or scanned by an image capture device and processed to extract or identify unique wear marks that can be stored as a template. The template is then used to recognize the object in the future to authenticate the user.

By utilizing a bring-your-own-authentication device scheme, the described solution is scalable, inexpensive, and user friendly. Moreover, because the imperfections are unique, the solution provides a secure authentication method. Further, the authentication device (i.e., object) can easily be changed and/or different authentication devices can be used for different purposes.

In one example, an authentication system includes an image capture device to scan an object. The authentication system also includes an authentication module to identify imperfections in the object based on the scan, to generate model data based on the identified imperfections, and to authenticate the user based on a comparison of currently identified imperfections to the model data.

In another example, a method for authenticating a user based on an object includes obtaining a first scan of an object to identify imperfections in the object. The method includes generating a template for the object based on the identified imperfections. The method includes obtaining a second scan of the object in response to an authentication request. The method also includes authenticating the user based on a comparison of imperfections identified in the second scan to the template.

In another example, a non-transitory computer-readable storage medium includes instructions that if executed cause a processor of an authentication device to scan an object to identify imperfections in the object. The instructions cause the processor to generate a template for the object based on the imperfections, where the template is generated during an enrollment of the object. The instructions cause the processor to compare imperfections identified in a second scan of the object to the template, where the second scan is in response to an authentication request. The instructions also cause the processor to authenticate a user based on the comparison.

Referring now to the figures, FIG. 1 is an example of an authentication system for authenticating a user based on an object. Authentication system 100 can be any computing device or apparatus for authenticating a user. Authentication system 100 includes an image capture device 120 and an authentication module 130.

Image capture device 120 can be a high-resolution imaging device to scan or read an object 140. For example, image capture device 120 can be a high-resolution camera, scanner, or electronic reader. Thus, image capture device 120 can obtain a live scan of the object 140 for processing by the authentication module 130.

Object 140 can be a wearable device, a fashion accessory, or any other object that can acquire unique imperfections 142 through the manufacturing process, wear and tear, and/or daily use, for example. To illustrate, object 140 can be a ring, bracelet, broche, necklace, watch, belt buckle, or an item of clothing provided by the user. In certain examples, a metallic object may be used because it possesses the necessary wear resistance that is soft enough to allow imperfections but hard enough to prevent too much change during daily wear. Further, hard metals may acquire factory (or manufacturing) imperfections. In other examples, non-metallic objects such as objects (e.g., fashion accessories) made from metamorphic rocks such as jade, garnet, etc. may be used.

In addition to imperfections created during manufacturing and daily wear, object 140 may have a unique composition that makes it suitable for secure authentication. For example, jade is a sodium and aluminum rich pyroxene, subject to shading due to the uneven distribution of impurities in the mineral. Thus, object 140 can be metallic, non-metallic, or any other object that may acquire unique imperfections 142. Further, authentication system 100 can be configured to store or identify expected capacitance or resistance of object 140. For example, system 100 can detect or identify a type of material the object 140 is composed of, and estimate or determine the object's expected imperfections 142.

Authentication module 130 can include a series of instructions encoded on a machine-readable storage medium and executable by a processor. In addition, or as an alternative, authentication module 130 may include one or more hardware devices including electronic circuitry for implementing the functionality described below. Thus, authentication module 130 can be implemented as a combination of in software and hardware.

Authentication module 130 can generate model data 132 based the imperfections 142 identified or extracted from the scan by the image capture device 120. Model data 132 represents a template that is stored by the authentication system 100 against which future imperfections in the object are compared for authentication purposes. For example, the user can be authenticated based on a comparison of currently identified imperfections (e.g., in response to an authentication request) to the model data 132. Model data 132 and data representing object imperfections 142 can be stored on a storage medium (not shown) that may be internal to the system 100, or external to the system 100 but accessible to the system 100 (e.g., via communication link).

In some examples, model data 132 is generated during an initial enrollment of the object 140, where the user presents the object 140 as a desired authentication device. It should be noted however that in some examples, the object 140 may be chosen/selected (e.g., by management) as a user authentication device. During enrollment, the image capture device 120 scans or reads the object when the object 140 is initially presented. Authentication module 130 processes the scan to identify imperfections 142, and to generate model data 132 that is used to authenticate the user in the future. In some examples, the image capture device 120 can identify the object imperfections 142 and the object imperfections 142 are used by the authentication module 130 to generate the model data 132. It should be noted that a particular user may present one or more objects 140 as an authentication device, and model data 132 can be generated for each object 140.

Further, in certain examples, multiple objects 140 provided by the user may be used for different purposes, allow different actions to be taken by the user, and/or set different levels of security/authentication for the user. To illustrate, the user may desire to have their ring serve as the authentication device for access into a facility/building, they may desire to have their watch serve as the authentication device for access to a secure processing system (e.g., computer), they may desire to have their bracelet or even a car key serve as the authentication device for another type of access (e.g., a specific room or computing system, ATM machine, payment device, etc). Because the different objects 140 are objects the user usually has on their person and because only the user knows what object 140 serves a particular authentication purpose, increased security, flexibility, and a low cost can be achieved.

As a further example, by reading imperfections in an object, the user can not only be authenticated and granted specific access, but also be presented with configurations and/or settings based on the user's preferences. To illustrate, a user can insert a standard metallic key into a smart lock that includes a reader. By reading the imperfections from the key, the lock can authenticate the key and determine which, if any, of a set of similar keys is being used and determine the identity of the user. Further, the user can be provided with their preferred settings (e.g., seat height and position, steering wheel settings, etc. in a car).

In some examples, a confidence level can be assigned to the object 140 based on the quantity and/or quality of imperfections in the object 140. For example, a metallic ring can be assigned a confidence value of 0.95 (on a scale of 0 to 1.0) to authentication using the ring. This means that when a person, for example John, has authenticated himself using the ring, the system's "confidence level" that the person is really John is 0.95. In this example, objects with more imperfections may be assigned a higher confidence level than objects with fewer imperfections. The confidence levels (based on the imperfections in the object) may also be used to determine the level/type of access or security the presented object 140 can receive. Thus, for example, management may require objects 140 that are to be used for a high level of security, clearance, or access to meet a threshold confidence level (i.e., present objects with high quality/quantity of imperfections).

In certain examples, the user is authenticated if a correspondence (or similarity) between the currently identified imperfections and the model data is above a predetermined threshold. For example, the user may be granted access or authenticated if when the object 140 is scanned, the similarity between the currently identified imperfections and the model data 132 is high (e.g., exceeds a minimum threshold similarity), based on the comparison.

In some examples, if the comparison of currently identified imperfections to the model data 132 exceeds a predetermined threshold and new imperfections are identified, the authentication module 130 updates the model data 132 with the new imperfections. If, however, the imperfections in the model data 132 are missing (e.g., due to the user polishing the object 140) from the currently identified imperfections and the comparison exceeds the predetermined threshold, the authentication module 130 re-enrolls the object 140 and generates new model data for the object 140.

Figure 2:
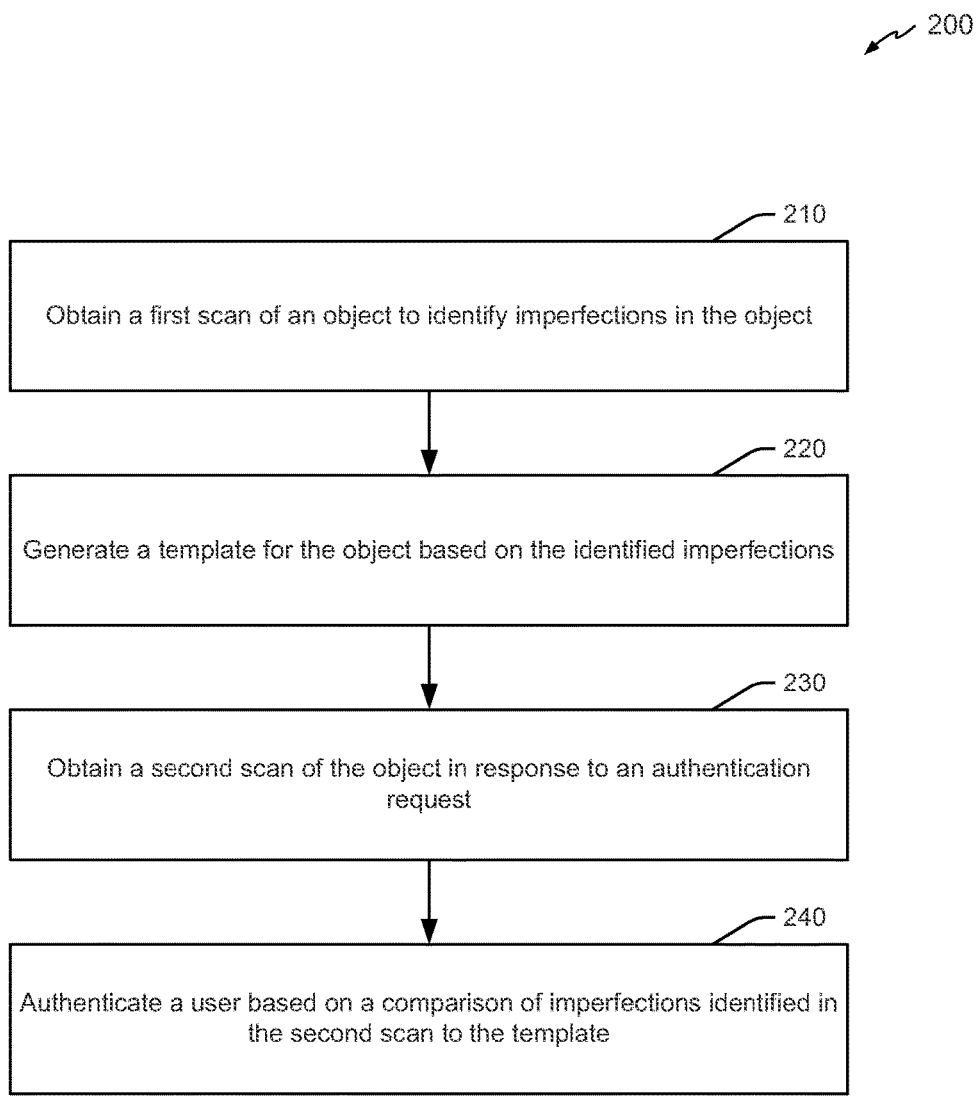
FIG. 2 is an example flowchart illustrating a method for authenticating a user based on an object.

FIG. 2 is an example flowchart illustrating a method for authenticating a user based on a user provided object. Method 200 may be implemented, for example, in the form of executable instructions stored on a non-transitory computer-readable storage medium and/or in the form of electronic circuitry.

Method 200 includes obtaining a first scan of an object to identify imperfections in the object, at 210. For example, imperfections 142 may be a result of at least one of a manufacturing process and normal wear and tear of the object 140. In some examples, image capture device 120 can scan the object and authentication module 130 can identify imperfections 142 in the object 140. The first scan can be obtained during an initial enrollment of the object with the authentication system 100, for example.

Method 200 includes generating a template for the object based on the identified imperfections, at 220. For example, authentication module 130 can generate a template or model data 132 based on the imperfections 142. Data representing the imperfections 142 and the model data 132 can be stored at the authentication system 100 or at an external storage device accessible to the authentication system 100.

Method 200 includes obtaining a second scan of the object in response to an authentication request, at 230. For example, when the user is to be authenticated, image capture device 120 can scan the object 140 and authentication module 130 can process the scan to identify imperfections (i.e., current imperfections).

Method 200 includes authenticating the user based on a comparison of the imperfections identified in the second scan to the template, at 240. For example, the currently identified imperfections from the second scan are compared to the model data 132 from the first scan to authenticate the user. In some examples, the method 200 of FIG. 2 includes additional steps in addition to and/or in lieu of those depicted in FIG. 2.

Figure 3:
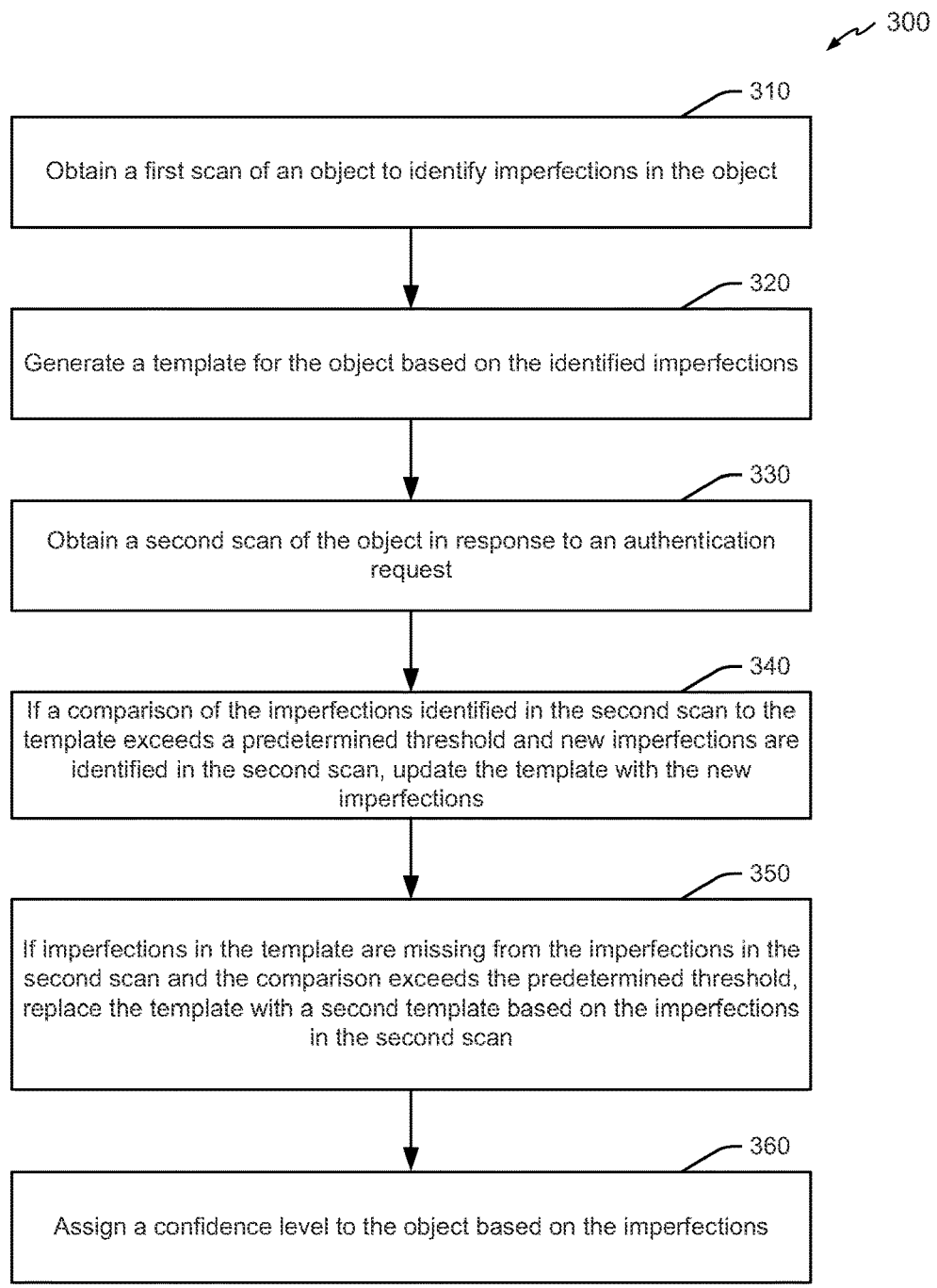
FIG. 3 is another example flowchart illustrating a method for authenticating a user based on an object.

FIG. 3 is another example flowchart illustrating a method for authenticating a user based on an object. Method 300 may be implemented, for example, in the form of executable instructions stored on a non-transitory computer-readable storage medium and/or in the form of electronic circuitry.

Method 300 includes obtaining a first scan of an object to identity imperfections in the object, at 310. For example, image capture device 120 can scan object 140 and authentication module 130 can process the scan to identify imperfections 122.

Method 300 includes generating a template for the object based on the identified imperfections, at 320. For example, authentication module 130 can generate model data 132 based on the imperfections 122.

Method 300 includes obtaining a second scan of the object in response to an authentication request, at 330. For example, the user may provide the object 140 for authentication purposes to get access to a facility, information, and/or computing device.

Method 300 includes, if a comparison of the imperfections identified in the second scan to the template exceeds a predetermined threshold and new imperfections are identified in the second scan, updating the template with the new imperfections, at 340. For example, authentication module 130 can update the template if the comparison exceeds a predetermined threshold and new imperfections are identified in the second scan. The template is thus updated to reflect the new imperfections.

Method 300 includes, if imperfections in the template are missing from the imperfections in the second scan and the comparison exceeds the predetermined threshold, replacing the template with a second template based on the imperfections in the second scan, at 350. For example, authentication module 130 can generate a second template (based on the second scan) if the comparison exceeds the predetermined threshold and the imperfections in the template are missing (e.g., due to polishing of the object 140) or are not found in the imperfections of the second scan. The second template replaces the template. For example, new model data is generated based on the second scan and replaces model data 132.

Method 300 includes assigning a confidence level to the object based on the imperfections, at 360. For example, the authentication module 130 can assign a confidence level to the object 140 based on the quantity and/or quality of imperfections in the object 140. For example a higher confidence level (e.g., 0.95) can be assigned to an object with more imperfections that another object with less imperfections (e.g., 0.75). In some examples, the method 300 includes additional steps in addition to and/or in lieu of those depicted in FIG. 3.

Figure 4:
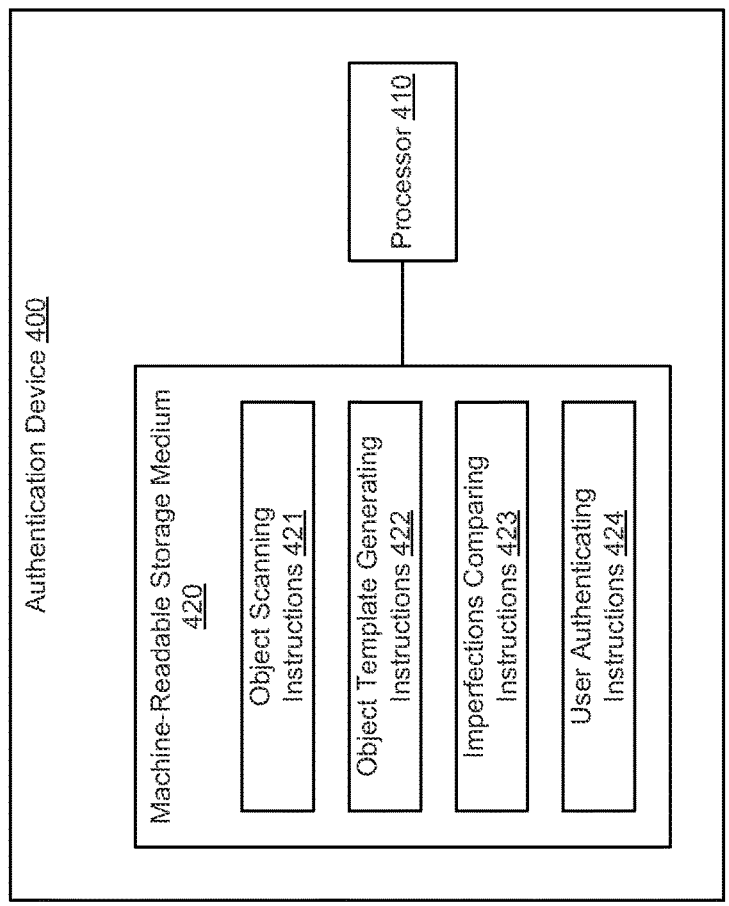
FIG. 4 illustrates an example of an authentication device including a computer-readable medium having instructions to authenticate a user based on an object.

FIG. 4 illustrates an example of an authentication device including a computer-readable medium having instructions to authenticate a user based on an object. Device 400 can include a non-transitory computer-readable medium 420. The medium 420 can include instructions 421-424 that if executed by a processor 410 can cause the device 400 to perform the functionality described below.

For example, object scanning instructions 421 are executable to scan an object to identify imperfections in the object. Object template generating instructions 422 are executable to generate a template for the object based on the imperfections, where the object template is generated during an enrollment of the object. Imperfections comparing instructions 423 are executable to compare imperfections identified in a second scan of the object to the template, where the second scan is in response to an authentication request. User authenticating instructions 424 are executable to authenticate the user based on the comparison.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. An authentication system, comprising:
  an image capture device to scan an object, wherein the object is an accessory of a user;
  a processor; and
  a machine-readable storage medium storing instructions that are executed by the processor to:
    generate model data that represents a template of imperfections associated with the object during an initial enrollment of the object;
    identify current imperfections in the object based on the scan, wherein the current imperfections are from at least one of a manufacturing process or wear and tear;
    compare the current imperfections to the template of imperfections of the model data;
    determine that a correspondence between the current imperfections and the template of imperfections of the model data is above a predetermined threshold;
    authenticate the user when the correspondence is above the predetermined threshold; and
    configure a device based on preferences of the user when the user is authenticated,
    wherein if the comparison of the currently identified imperfections to the model data exceeds a predetermined threshold and new imperfections are identified, the model data is updated with the new imperfections,
    wherein if imperfections in the model data are missing from the currently identified imperfections and the comparison exceeds a predetermined threshold, the object is re-enrolled and new model data for the object is generated.

2. The authentication system of claim 1, wherein the imaging device includes a high-resolution imaging device.

3. The authentication system of claim 1, wherein the object is provided by the user as an authenticating device.

4. The authentication system of claim 1, wherein the currently identified imperfections are identified by the image capture device in response to an authentication request.

5. The authentication system of claim 1, the instructions are further to assign a confidence level to the object based on the imperfections that are identified.

6. The authentication system of claim 5, the confidence level is based on a uniqueness determination of the imperfections.

7. A method for authenticating a user based on an object, comprising:
- obtaining a first scan of an object to identify imperfections in the object, wherein the object is an accessory of a use;
- generating a template for the object based on the imperfections that are identified, wherein the current imperfections are from at least one of a manufacturing process or wear and tear;
- obtaining a second scan of the object in response to an authentication request to identify current imperfections;
- comparing the current imperfections to the template;
- determining that a correspondence between the current imperfections and the template is above a predetermined threshold;
- authenticating the user when the correspondence is above the predetermined threshold;
- configuring a device based on preferences of the user when the user is authenticated;
- if the comparison of the current imperfections identified in the second scan to the template exceeds the predetermined threshold and new imperfections are identified in the second scan, updating the template with the new imperfections; and
- if imperfections in the template are missing from the current imperfections identified in the second scan and the comparison exceeds the predetermined threshold, replacing the template with a second template based on the current imperfections identified in the second scan.

8. The method of claim 7, comprising:
- assigning a confidence level to the object based on the imperfections identified in the second scan.

9. A non-transitory computer-readable medium comprising instructions that when executed cause a processor of an authentication device to:
- scan an object to identify imperfections in the object, wherein the object is an accessory of a use;
- generate a template for the object based on the imperfections, wherein the template is generated during an enrollment of the object, wherein the current imperfections are from at least one of a manufacturing process or wear and tear;
- compare current imperfections identified in a second scan of the object to the template, wherein the second scan is in response to an authentication request;
- determine that a correspondence between the current imperfections and the template is above a predetermined threshold;
- authenticate the user when the correspondence is above the predetermined threshold;
- configure a device based on preferences of the user when the user is authenticated;
- update the template if new imperfections are identified in the second scan and a comparison of the current imperfections to the template exceeds the predetermined threshold, wherein the template is updated with the new imperfections;
- replace the template with a second template, if imperfections in the template are missing from the current imperfections identified in the second scan and the comparison exceeds the predetermined threshold; and
- assign a confidence level to the object based on an amount of the imperfections that are identified in the object.

* * * * *